Patented Jan. 30, 1934

1,944,958

UNITED STATES PATENT OFFICE 1,944,958

PURIFICATION OF AROMATIC ALCOHOLS

Ludwig Valik and Irene Valik, Charleston, W. Va.

No Drawing. Application June 1, 1932
Serial No. 614,840

6 Claims. (Cl. 260—153)

This invention relates to improvements in the purification of aromatic alcohols, and more particularly to such aromatic alcohols as the phenylethylalcohols, the tolylethylalcohols, the xylylethylalcohols, the tolylpropylalcohols, and the xylylpropylalcohols.

The object of this invention is to provide a method whereby the aromatic alcohols produced can be purified and refined.

This invention comprehends the purification and refinement of the aromatic alcohols, which can be produced by known processes, including in addition to the phenylethylalcohols the tolylethylalcohols, the xylylethylalcohols, the tolylpropylalcohols and the xylylpropylalcohols. It has been found that purification can be accomplished by treating the above named aromatic alcohols with mineral oils or waxes, or a mixture of both, depending upon the solubility of the impurity necessary to be removed.

Aromatic acids, esters, aldehydes and similar compounds are, for example, impurities of the type which volatilize and cover the desired and characteristic odor of the aromatic alcohol produced. While these impurities can not be removed by fractional distillation, they can, due to their complete and partial solubility in white odorless mineral oil or mineral wax, be completely eliminated.

This method of purification can also be utilized for refining aromatic alcohols already partly purified by fractional distillation or even for crude aromatic alcohols, and with the exception of the very costly method involving the use of calcium chloride compounds is believed to be the most effective.

Excellent results for such purification are obtained by using well refined white, and nearly odorless, mineral oils and mineral waxes, whose lowest boiling point is higher than the boiling point of the aromatic alcohol to be purified.

The solubility of aromatic alcohols in mineral oils and mineral waxes varies. By using a white and odorless mineral oil of the specific gravity 0.85 at 15 degrees centigrade the solubility of phenylethyl alcohol is approximately one per cent.

Aromatic alcohols under heat are perfectly soluble, to a clear solution, in mineral oils and waxes. They separate into layers when cooled. This purification takes place by dissolving the aromatic alcohols in mineral oils or waxes, or in a mixture of both, and separate the mixture by shaking or by distillation.

While the following examples will show, perhaps, more clearly the detailed conditions under which the process can be most effectively and economically carried out, they are herein presented for illustrative purposes only and are in no sense to be considered as limiting the invention to the specific conditions set forth.

Example I

One hundred gms. of crude-phenylethylalcohol was found to have, after fractional distillation, a considerable odor of dibenzyl and ethylenchlorhydrin. The impure alcohol, which when pure has a faint natural rose odor, was dissolved in 300 gms. of white odorless mineral oil and kept at a temperature of substantially 95° C. for three hours. After being allowed to stand for several hours time, perfect, water clear layers were obtained, the lower layer (phenylethylalcohol) was separated and the procedure repeated three times. The phenylethyl alcohol was found to be equally as pure as that refined by the costly method involving calcium chloride.

Example II

One hundred gms. of phenylethylalcohol, which was obtained from benzylchloride and which was found to have a distinct honey odor, was purified by shaking with mineral oil for one hour at 40° C. After the operation was repeated several times, the phenylethylalcohol upon separation was found to have lost its impure odor.

The process will require approximately 300 gms. of oil or wax for each 100 gms. of alcohol to be purified and this can be purified for use again by steam distillation.

While we have shown and described the preferred embodiment of our invention, we wish it to be understood that we do not confine ourselves to the precise details herein set forth by way of illustrations, as it is apparent that many changes and variations may be made therein by those skilled in the art without departing from the spirit of the invention, or exceeding the scope of the appended claims.

We claim:

1. A process for the purification of aromatic alcohols comprising adding a mineral oil to the impure alcoholic mixture, heating the whole mixture and separating the resulting pure aromatic alcohol.

2. A process for the purification of aromatic alcohols comprising adding a mineral wax to the impure alcoholic mixture, heating the whole mixture and separating the resulting pure aromatic alcohol.

3. A process for the purification of aromatic alcohols comprising adding a mixture of mineral oil and mineral wax to the impure alcoholic mixture and heating the whole mixture, then separating the resulting pure aromatic alcohol.

4. A process for the purification of aromatic alcohols comprising adding a mineral oil to the impure alcoholic mixture, heating to substantially 95° C. and separating the resulting aromatic alcohol solutions by decantation and distillation.

5. A process for the purification of higher alcohols insoluble at normal temperature in a mineral oil of higher boiling point, comprising dissolving the alcohol and the impurities in the oil at an elevated temperature, and cooling to effect separation of the purified alcohol.

6. A process for the purification of higher alcohols insoluble at normal temperature in a mineral oil of higher boiling point comprising dissolving the alcohol and the impurities in an excess of the oil at an elevated temperature, and cooling to effect separation of the purified alcohol.

LUDWIG VALIK.
IRENE VALIK.